United States Patent
Madsen

(10) Patent No.: US 7,670,481 B2
(45) Date of Patent: Mar. 2, 2010

(54) DEVICE FOR TREATING FLUIDS, ESPECIALLY WASTE WATER, COMPRISING A STACK OF DISKS

(75) Inventor: Steffan Madsen, Orsted (DK)

(73) Assignee: Grundfos Management a/s, Bjerringbro (DK)

( * ) Notice: Subject to any disclaimer, the term of this patent is extended or adjusted under 35 U.S.C. 154(b) by 59 days.

(21) Appl. No.: 11/912,677

(22) PCT Filed: Mar. 21, 2006

(86) PCT No.: PCT/EP2006/002550

§ 371 (c)(1),
(2), (4) Date: Oct. 26, 2007

(87) PCT Pub. No.: WO2006/114169

PCT Pub. Date: Nov. 2, 2006

(65) Prior Publication Data

US 2008/0210620 A1    Sep. 4, 2008

(30) Foreign Application Priority Data

Apr. 28, 2005   (EP)   ................................. 05009339

(51) Int. Cl.
*C02F 3/08* (2006.01)
(52) U.S. Cl. .................. 210/150; 210/330; 210/402; 210/416.1
(58) Field of Classification Search .................. 210/150, 210/151, 330, 331, 402, 416.1, 619, 780
See application file for complete search history.

(56) References Cited

U.S. PATENT DOCUMENTS

| | | | | |
|---|---|---|---|---|
| 2,544,402 A * | 3/1951 | Tessmer | ...................... | 210/331 |
| 3,169,920 A * | 2/1965 | Payne | ......................... | 210/331 |
| 3,466,241 A * | 9/1969 | Simpson | ..................... | 210/151 |
| 4,116,842 A * | 9/1978 | Meier | ......................... | 210/330 |
| 4,126,545 A * | 11/1978 | Hagiwara | ................... | 210/150 |
| 4,162,195 A | 7/1979 | Solyom et al. | | |
| 4,282,094 A * | 8/1981 | Mitchell | .................. | 210/416.1 |
| 4,530,763 A * | 7/1985 | Clyde et al. | ................. | 210/619 |
| 4,975,188 A * | 12/1990 | Brunsell et al. | ............. | 210/331 |
| 4,999,302 A * | 3/1991 | Kahler et al. | ............... | 210/619 |
| 5,290,435 A * | 3/1994 | Stilkenboom | ............... | 210/151 |
| 5,707,517 A * | 1/1998 | Rolchigo et al. | ............ | 210/330 |
| 5,853,591 A * | 12/1998 | Snyder et al. | ............... | 210/151 |
| 5,855,799 A | 1/1999 | Herrmann | | |
| 2003/0010694 A1 * | 1/2003 | Holt | ........................ | 210/416.1 |

FOREIGN PATENT DOCUMENTS

EP    0 222 937 A1    5/1987
WO    02/094724 A1    11/2002

* cited by examiner

*Primary Examiner*—Christopher Upton
(74) *Attorney, Agent, or Firm*—Panitch Schwarze Belisario & Nadel LLP

(57) ABSTRACT

A device is provided for treating waste water, the device including a closed housing containing at least one stack of disks through which waste water can flow. A circulating pump is provided for pumping the fluid, the pump forming a structural unit including the housing and the stack of disks arranged therein.

17 Claims, 3 Drawing Sheets

DEVICE FOR TREATING FLUIDS, ESPECIALLY WASTE WATER, COMPRISING A STACK OF DISKS

CROSS-REFERENCE TO RELATED APPLICATIONS

This application is a Section 371 of International Application No. PCT/EP2006/002550, filed Mar. 21, 2006, which was published in the German language on Nov. 2, 2006, under International Publication No. WO 200 6/114169 A1 and the disclosure of which is incorporated herein by reference.

BACKGROUND OF THE INVENTION

The invention relates to a device for fluid treatment, in particular to waste water treatment, having a circulation pump and a closed housing, in which is arranged at least one disk stack through which waste water may flow.

Such devices for waste water treatment, in which at least one disk stack, through which waste water flows, is arranged in a closed housing and in which the waste water is circulated by way of a circulation pump, is known from International Publication No. WO 02/094724 A1, for example. There, two disk stacks which mesh with one another and which many be moved relative to one another by way of a drive motor, in order to remove the biological coating growing on the surfaced sides of the disks to a desired extent, are arranged within a housing. Waste water flows radially through the disk stacks, which thereby is purified by the biological coating in the form of the microorganisms, adhering to the disks, i.e. the substances located in the waste water are broken down biologically. In order to convey the water through these biological filters, a circulation pump in the form of a centrifugal pump is provided, with which the waste water may be circulated within the biological filter, as well as being able to be delivered in and out of this.

With this known device, the disk stacks are arranged within a closed housing, wherein a drive shaft is led out to one side, via which a drive of a disk stack is effected. Pipe connections are provided at the other side, to which a circulation pump is to be connected.

The disadvantage with the designs described there, is the fact that they are not only expensive with regard to their construction, but furthermore also require a stationary assembly, since apart from the actual bio-filter, one also needs to provide the circulation pump assembly as well as the associated piping, which takes up much space and requires some effort with regard to construction.

BRIEF SUMMARY OF THE INVENTION

Against this background, it is an object of the invention, to provide a device of the known type, such that it may be constructed in a manner which is as space-saving as possible, and may be designed in an inexpensive and compact manner.

This object is achieved according to the invention by having the housing, with the disk stack located therein, and the circulation pump form a construction unit. Advantageous embodiments of the invention are specified in the following description and the drawings.

The device according to the invention for fluid treatment, in particular waste-water treatment, comprises a closed housing in which at least one disk stack is arranged through which waste water may flow, wherein the housing, with the disk stack located therein, and the circulation pump, which ensures the fluid circulation within the housing, form a construction unit.

The basic concept of the present invention is therefore to completely make do without a separate pump, and the piping between the biological filter and the pump which this requires, and instead, to design the circulation pump and the housing as a construction unit.

Thereby, advantageously at least a part of the pump is a constituent of the housing, in order in this manner, on the one hand to provide a space-saving design, and on the other hand to reduce the manufacturing costs and assembly costs compared to known devices.

Thereby, the circulation pump may either be designed in a submersing manner in the form of a submersible pump within the housing, typically into the disk stack, or only form a part of the housing, typically an end-side cover or a transverse wall. With the first solution, it is particularly advantageous for the pump to be arranged completely or at least to a great extent within the disk stack, preferably in a central cavity which is anyway only used for through-flow purposes.

A particularly inexpensive housing construction shape results if the housing is designed in a tubular manner, since then, the tubular part may be formed by a tube or a tube section, and one merely needs to provide covers or other terminating transverse walls on the end side. Basically, although a tubular housing may be manufactured by molding, i.e. as a cast part, the construction from a cut-to-size tube, in combination with end-side covers or a transverse wall, is often more favorable, since with this construction form one may also apply disk stacks of different size without special housing variants having to be provided for this. With a housing designed in a tubular manner, it is particularly favorable to arrange the centrifugal pump in or on a transverse wall or an end-side cover which may form the transverse wall. The circulation pump may thereby be integrated at least partly into the housing in a space-saving manner, and given a suitable design of the transverse wall, this may also form part of the pump or at least serve for fastening the pump.

If this transverse wall is formed by a cover closing the housing at the end-side, this has the advantage that on account of the cover, on the one hand the tubular housing is closed at the end-side, and on the other hand, the pump fastened on or in the cover may be arranged such that typically the electrical drive part is arranged outside, and the hydraulic drive part within the cover or housing. In the ideal case, one may thereby completely make do without piping, and the circulation pump may be integrated into the device in an almost ideal manner.

A further advantage of the cover arrangement is that after the removal of the cover from the housing, on the one hand the pump is well accessible, and on the other hand the disk stacks within the housing are also easily accessible. Usually, two or more disk stacks mesh with one another, for example in that one or more disk stacks are stationary and the other or several disk stacks may be moved relative to this. In any case, a drive for the rotation of at least one disk stack is necessary. This drive advantageously comprises a drive motor arranged outside the housing, so that the electrical components of the motor do not need to be sealed and insulated with respect to the fluid located in the housing. For this purpose, the motor is advantageously arranged on the cover in a direct or indirect manner, wherein the drive shaft is led in a sealed manner through the cover in which the centrifugal pump is arranged. Such an arrangement has the advantage that all electrical connections of the device are arranged at one side, and furthermore, the remaining housing may be designed in a comparatively inexpensive and simple manner.

The motor driving the pump is advantageously arranged within this cover closing the tubular housing to one side, or on this component. This arrangement too has the advantage that the motor does not come into contact with the fluid located within the housing, and all electrical connections are freely accessible from the outside.

It is particularly advantageous for the cover not only to serve for fastening the circulation pump, but also for the cover to form at least also a part of the pump housing, since in this manner a component, which is required anyway, may assume functions for the pump as well as for the housing of the device.

The cover thereby is advantageously designed of several parts, and comprises an outer cover part which closes the housing to the outside, as well as an inner cover part which closes the cover to the inside, which are connected to one another in a preferably detachable manner. The cover may assume further pump-side functions by way of this multipart construction. Furthermore, with a suitable design, one may apply components free of undercuts on account of the multipart construction, which may be manufactured inexpensively.

Advantageously here, the cover inner part is designed such that it forms the suction port of the pump. Here, with a suitable design of the device, one may for example connect a central channel leading through the disk stacks to the suction port of the pump in a direct manner within the housing, so that very direct and favorable flow conditions are achieved.

It is advantageous if an intermediate part is provided between the cover inner part and the cover outer part, the intermediate part surrounding an impeller of the pump and in which the pressure-side flow channel of the pump lies. The actual pump housing, in particular the hydraulically effective part of the pump housing, is then formed by this intermediate part. The provision of such an intermediate part is particularly favorable with regard to manufacturing technology, since then, given a suitable design, all cover components may be able to be manufactured in a comparatively simple manner, as the case may be also without undercuts. However, one may also group components together. It may therefore be advantageous to design the cover inner part and the intermediate part as one piece as a common component, which quasi forms the complete pump housing from the suction port to the pressure-side exit.

The intermediate part advantageously comprises an ejector, thus a jet pump, with which gas may be admixed to the pressure-side channel of the pump. Such gas is typically required with devices of this type, in order to control the biological/chemical process or maintain this. Such a gas, typically a gas containing oxygen, may be supplied to the fluid system without external energy by way of the ejector.

It is advantageous if the ejector comprises a first gas channel running through the cover inner part and leading into the housing, and preferably a second gas channel running through the cover outer part and leading outwards, outside the housing. Then specifically, by way of this gas channel, the upper cover inner part is connected to the inside of the housing, where a gas bubble also exists during operation of the device. At the same time, a connection to a gas reservoir, e.g., a pressurized gas bottle, is formed via the second channel from outside the housing, so that gas from the reservoir or gas from the housing may be admixed to the fluid flow, depending on the process control and requirements.

The housing with its middle longitudinal axis is arranged roughly horizontally, in order to ensure that the gas bubble is always arranged in the region which is connected to the ejector via the channel in the cover inner part, wherein the channel leading to the ejector and running through the cover inner part runs out in the housing at the top.

The cover inner part advantageously comprises a further channel which connects the inside of the housing to the pressure side of the circulation pump, wherein this channel runs out within the housing below the channel leading to the ejector and at a distance preferably below and/or next to the suction port of the pump. With such an arrangement, via the suction port of the pump, one may centrally take fluid from the middle of the disk stack and introduce it through the pressure channel into the housing again, so that this fluid to be treated flows quasi radially from the outside inwards through the disk stack or disk stacks. Thereby, by way of the arrangement of the channels to one another, one ensures that the channel leading to the ejector always runs out in the region of the gas bubble and the two other channels (suction channel and pressure channel of the pump) run out below the fluid level within the housing.

The cover according to the invention, which may preferably be formed of two, three or more components, may be manufactured in an inexpensive manner as a milled part or, with larger production numbers, also as a cast part to be manufactured in a coreless manner.

The channel arrangement in the flow direction of the pump is advantageously such that an outlet channel for gas out of the housing and an inlet opening therebehind for gas out of the reservoir run out in the pressure channel, both however preferably in front of the ejector in the flow direction.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The waste water treatment device represented by way of the figures comprises an essentially cylindrical housing 1, which is formed of a tube section 2 with end covers 3 and 4, which close the tube section 2 at the ends.

Figure 1:
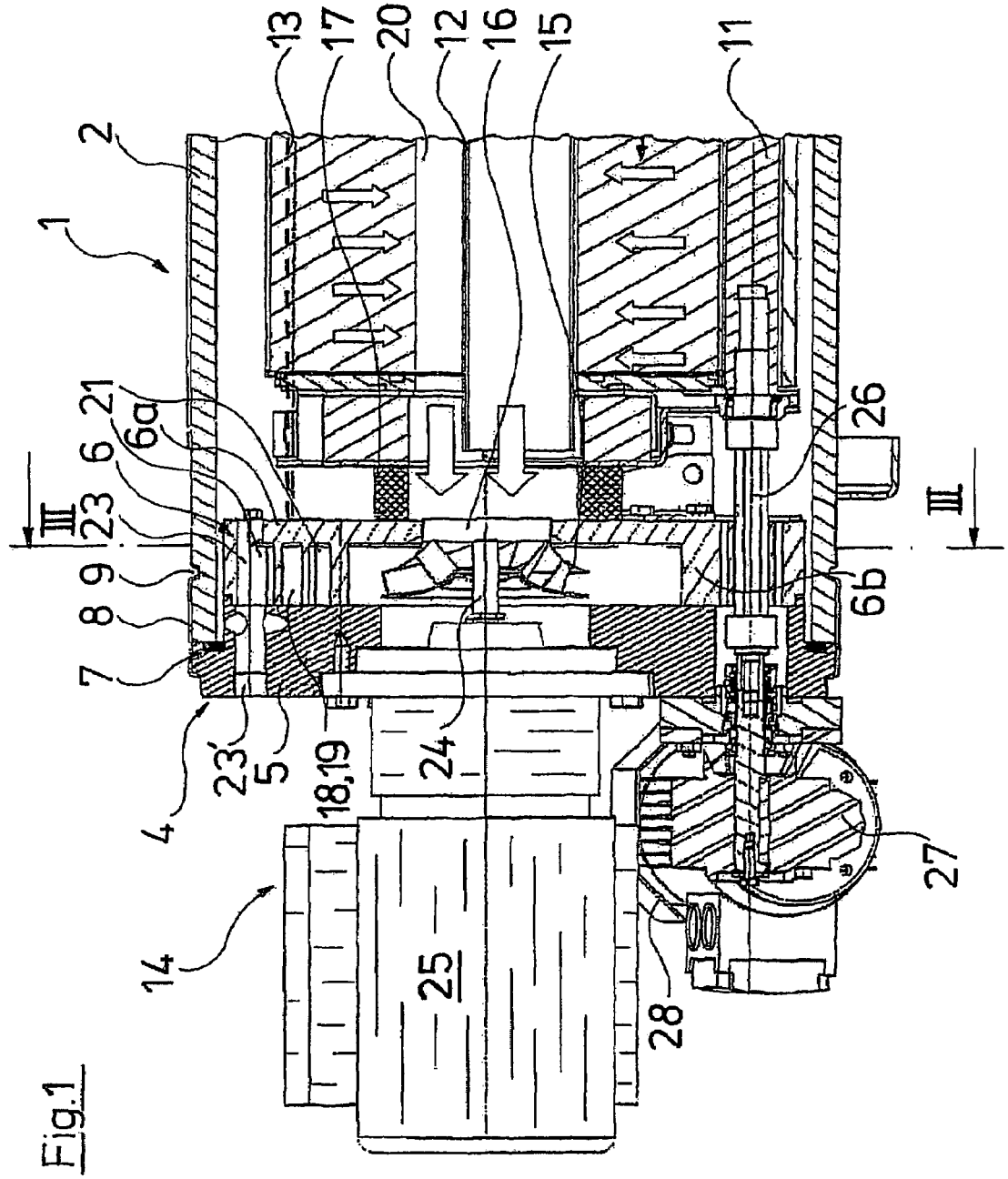
FIG. 1 is a greatly simplified longitudinal sectional view of a part of the device according to an embodiment of the invention.
Figure 2:
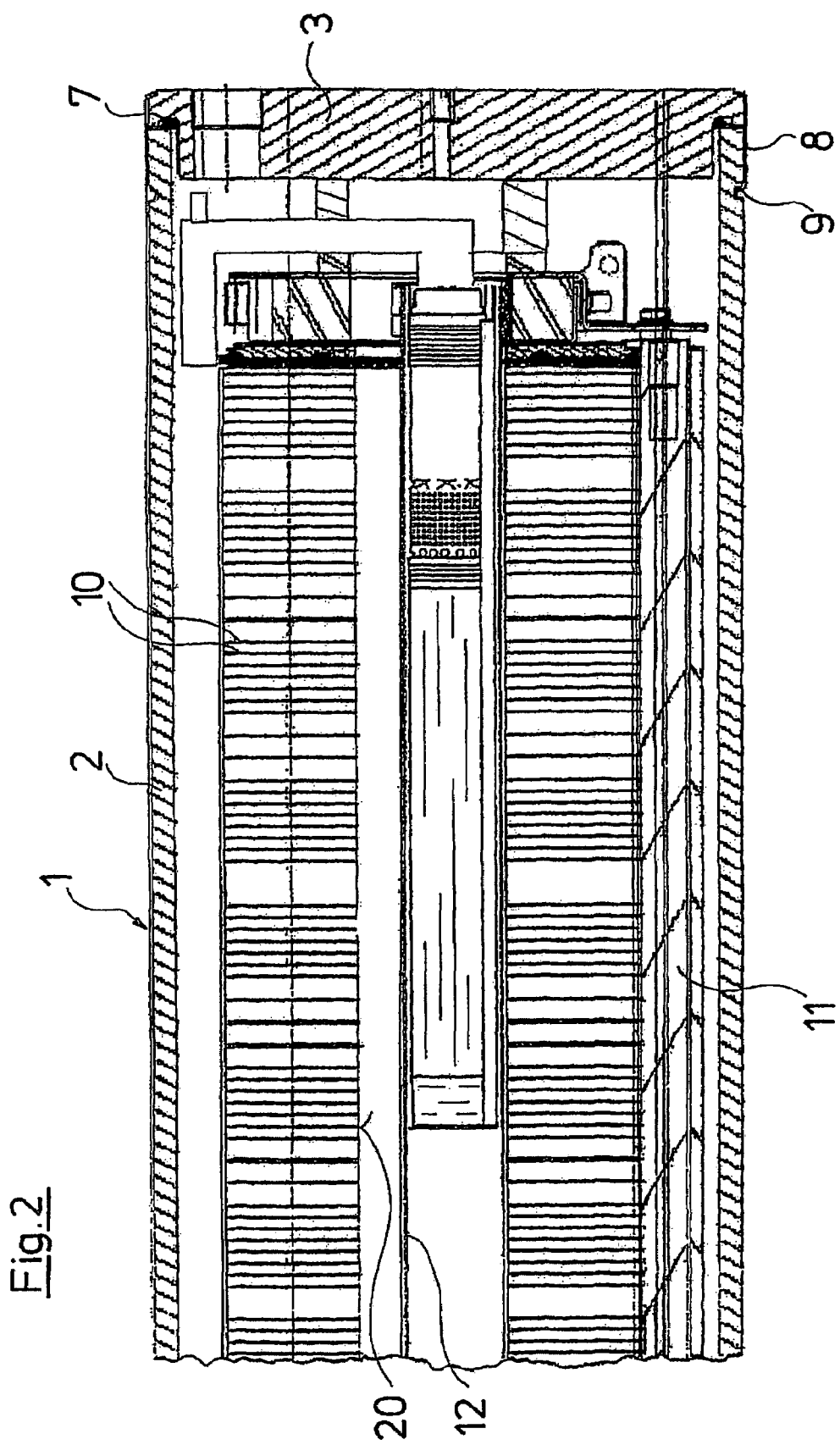
FIG. 2 is a greatly simplified longitudinal sectional view of the other part of the device shown FIG. 1.

Whereas the disk-like cover 3 closing the tube section 2 on the right side and represented in FIG. 2, is formed as one piece and in a stepped manner, so that it engages with one part into the tube section 2 and with another part lies on this at the end, the cover 4, shown in FIG. 1 and closing the tube section 2 on the left side in the drawing, is constructed of several parts.

The cover 4 consists of an outer disk-like cover part (cover outer part) 5 forming the actual cover, as well as a likewise disk-like intermediate inner part and cover inner part 6, which is releasably connected to the cover outer part 5. The cover outer part 5, just as the cover 3, likewise comprises a section engaging in the tube section 2, as well as a section bearing on this at the end, thus is designed in a stepped manner and provided with a seal 7, as is also provided on the cover 3, and seals the respective covers 3 and 4 with respect to the tube section 2.

The fastening of the covers 3, 4 on the tube section 2 is effected by way of a peripheral tension strap 8, which as a flat strip is formed with two radially inwardly pointing flanks. Of these flanks, the one engaging over the tube section 2 engages into a groove 9 at the end of the tube section 2, while the other engages over the cover 3 and 4 on the outer side and thus fixes this on the tube section 2 with a positive fit. The tension strap 8 is equipped with a tensioning device known per se, which in a first opened position extends the strap to such an extent that the flank may be pushed over the free end of the tube section 2, and in a second closed position tensions this, bearing tightly on the outer periphery of the tube section 2, as well as of the associated cover 3, 4, so that this is fixed with a non-positive and positive fit.

A disk stack, which is formed of a multitude of disks 10 arranged with a spacing next to one another, is arranged within the housing 1. The disk stack is constructed of two sorts of disks, which in each case are arranged in an alternating manner and are designed such that, with a drive by a rack 11 provided with teeth on the other periphery, they are rotated with a different speed and about different axes, as described in detail in European patent application 04 016 525.0, which is expressly referred to inasmuch as this is concerned. There, a comparable cylinder-shaped housing, with disk stacks arranged therein and whose drive is described by way of FIG. 6 and corresponds essentially to the present application, is shown by way of example in FIG. 9.

In any case, the disks 10 are rotatably arranged within the housing 1, and the drive is effected via the rack 11, which extends over essentially the whole length of the housing 1 and which engages into the outer toothings of the one of the two disk types. A tube 12 is led through central openings 20 of the disks 10 and comprises recesses, and not only serves for the removal of the fluid flowing radially inwards from the outside through the disk stack, but also as a counter bearing to the rack 12. This tube 12 has a significantly smaller diameter than the central openings 20 in the disks 10, so that the disks 10 of the disk stack do not roll on this tube 12 and thus do not roll about their central axis. This effect too, is described in detail in European patent application 04 016 525.0, and this is referred to inasmuch as this is concerned.

With an arrangement as specified, the housing 1 is aligned such that the housing longitudinal axis is arranged essentially horizontally. The waste water which is to be cleaned and is located within the housing 1 does not completely fill out the inside of the housing, but only up to a level 13, and the space located above this is filled with gas. The disk stack is not only radially supported within the housing, but also axially supported. The waste water located therein is circulated such that it flows in at the outer periphery of the disk stack, flows radially past and between the disks 10, and is led away again through the central recess 20 or the tube 12, as is indicated in FIG. 1 by the arrow representations.

A circulation pump 14 is provided, which is integrated in the cover 4, in order to build up the differential pressure required for the circulation or the supply and removal of the water. The circulation pump 14 is designed as a centrifugal pump and comprises an impeller 15, which is arranged within the cover 4, so that the cover 4 also forms the pump housing. The impeller 15 is radially surrounded by a cover intermediate part 6b, which in the represented embodiment is designed as one piece with a cover inner part 6a, which closes the cover intermediate part 6b to the inside of the housing and forms the suction port 16 of the pump.

A seal 17 is provided to the inside, between the suction port 16 of the pump and the disk stack, and this seal prevents an overflow between the suction side and pressure side of the pump. A housing volute, thus a channel 18 deflecting the pressure-side flow departing radially from the impeller, and an ejector 19, which connects thereto in the flow direction, is likewise formed within the cover intermediate part 6b and runs into a diffuser 20, which via a transverse recess 21 that passes through the cover inner part 6a, is conductively connected to the inside of the housing on the other side of the seal 17 below the level 13, are provided in the cover intermediate part 6b formed by the component 6.

Figure 3:
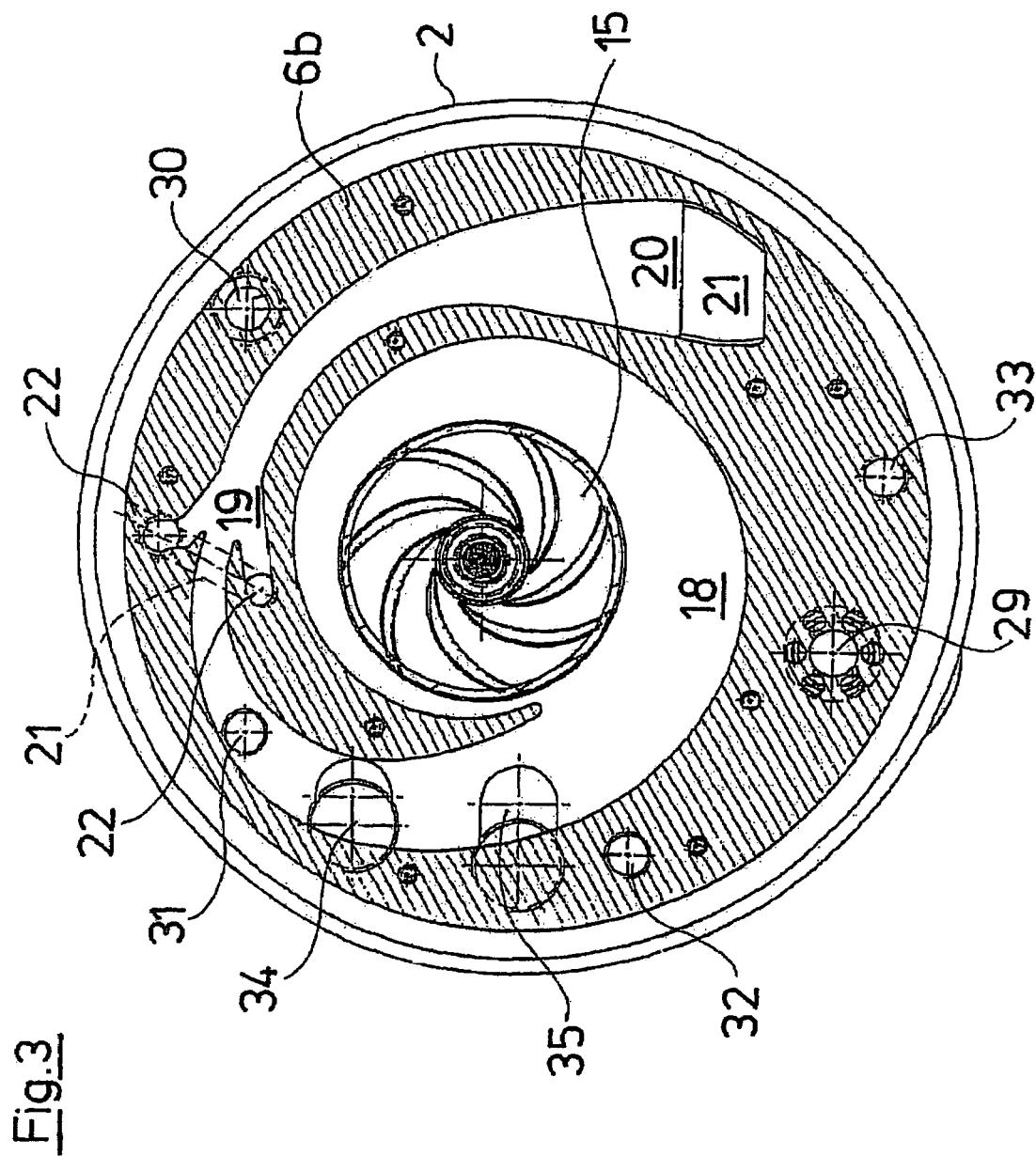
FIG. 3 is a transverse sectional view through the cover along the section III-III in FIG. 1.

The suction-side part of the ejector 19 forms a U-shaped channel 21, which is represented in FIG. 3 in dashed lines and runs out in the ejector 19 at two inlets 22. The U-shaped channel 21 is connected via a channel 23 which passes through the component 6, to the inside of the housing, and specifically above the water level 13, thus in the region of the gas bubble, and via a channel 23' arranged in the cover outer part 5 aligned thereto, is connected to the surroundings. The channel 23' is provided for connection to a conduit, which leads to a gas reservoir, here a pressurized oxygen bottle. Thus, oxygen may be supplied to the system via the channel 23'. Thus, in the ejector 19 during the pump operation, either oxygen from the pressurized bottle is introduced via the channel 23', or gas from the housing is introduced into the pressure-side fluid flow via the channel 23', and specifically by way of the U-shaped channel 21 via the inlet openings 22.

The impeller 15 of the centrifugal pump is seated on a shaft 24, which is driven by a drive motor 25, which is incorporated in a recess in the cover outer part 5 and is releasably fastened there. The shaft 24 carrying the impeller 15 is sealed with respect to the motor, and the motor 25 is designed as a dry runner. However, alternatively one may also use a wet-running motor, and then the sealing to the motor is effected essentially via the canned pot.

The cover 4 in its region at the bottom in FIG. 1 comprises yet another recess for the drives of the rack 11. For this, a shaft lead-through 29 is provided in the component 6, and this is designed in a sealed manner. The one end of this shaft 26 is connected to the rack 11, the other end to a coupling, via which the exit-side shaft of a worm gear 27 is connected, whose input shaft is connected to the drive shaft of a motor 28, which via the gear 27 together with this is fastened on the cover 4, in particular on the cover part 5, and ensures a rotational drive of the rack 11. As is evident from FIG. 1, the electrical connections of the drive motor 25 and the motor 28 lie outside the housing and are spatially assigned to one another, so that the electrical supply of the device may be effected from one side.

Not only are all electrical assemblies of the device unified in the cover 4, but also the sensor devices required for operation. Thus, a level sensor which is required for the closed-loop control of the degree of filling of the device, is arranged within a bore 30 of the component 6, in order on the one hand to ensure that the disk stack is completely submersed in fluid, and on the other hand that adequate free space is present for the gas bubble located in the upper region of the housing. The bore 30 passes through the cover 4, so that the sensor may be applied and is electrically connectable from the outside.

Furthermore, a bore 31 is provided in the cover outer part 5, which passes through this and runs out in the pressure channel 18 in the flow direction in front of the ejector 19. This bore 31 serves for integrating a pressure sensor for detecting the pressure on the pressure side of the pump. The suction-side pressure is detected by way of a tube (not shown in the drawings), which runs out in the region of the suction port of the pump and is connected via a bore 32 passing through the cover 4. A pressure sensor is likewise provided in this tube, so that the differential pressure of the pump may be detected with the help of the two pressure sensors.

Furthermore, a threaded bore 33, which is sealingly closed with a screw on operation, is provided in the lower region of the cover 4. This screw serves as a volute, after whose removal the fluid may flow out of the housing 1.

Two conduit connections, which run into recesses 34 and 35 of the cover outer part 5, are provided on the outer side of the cover 4, in particular of the cover outer part 5, and these connections are not visible in the drawings. The recesses 34 and 35 pass through the cover outer part 5 in a channel-like manner and run out in the cover intermediate part 6b within the pressure channel 18, and specifically, seen in the flow direction, firstly the recess 35 and therebehind the recess 34. The recess 35 serves for the removal of the water purified in the device, while the recess 34 is envisaged for the supply of the pipe water to be cleaned in the device.

Thus, with the design described above, all electrical sensor connections and conduit connections are integrated within the cover 4 or are arranged on this. The cover 4 in the previously described embodiment is formed of two components 5 and 6, which are designed without undercuts and thus are favorable with regard to manufacturing technology, for example by milling/drilling from a disk of round material. Here, the component 6 may consist of two individual components 6a and 6b, which bear on one another in a sealed and firm manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for fluid treatment, comprising a circulation pump, a closed housing (1), and at least one stack of disk-shaped filters for removing biological material from the fluid, through which fluid flows, arranged in the housing, wherein the housing (1), with the stack located therein, and the circulation pump form a unit, the circulation pump being arranged in or on a cover which closes the housing at one end, wherein the cover forms at least part of a pump housing for the circulation pump, the circulation pump being in fluid communication with the filters.

2. The device according to claim 1, further comprising a drive motor (28) arranged outside the housing (1) rotary drive of the stack, the drive motor having a drive shaft (26) led through the cover (4) in or on which the circulation pump is arranged.

3. The device according to claim 1, further comprising a pump motor (25) driving the circulation pump, the pump motor being arranged on an outer side of the cover (4).

4. The device according to claim 1, wherein the cover (4) comprises an outer cover part (5) closing the housing (1) to the outside and an inner cover part (6) closing the cover (4) to the inside, wherein the outer and inner cover parts are connected to one another.

5. The device according to claim 4, wherein the inner cover part (6) comprises a cover inner part (6a) which forms a suction port (16) of the circulation pump.

6. The device according to claim 5, wherein the inner cover part (6) further comprises an intermediate part (6b) between the cover inner part (6a) and the outer cover part (5), and wherein the intermediate part (6b) surrounds an impeller (15) of the circulation pump and a pressure-side flow channel (18) of the circulation pump lies in the intermediate part (6b).

7. The device according to claim 6, wherein the cover inner part (6a) and the intermediate part (6b) comprise one piece.

8. The device according to claim 6, wherein the outer cover part (5), the cover inner part (6a) and the intermediate part (6b) forming the cover (4) are free of undercuts.

9. The device according to claim 8, wherein the outer cover part (5), the cover inner part (6a) and the intermediate part (6b) are formed as milled parts or cast parts to be manufactured without a core.

10. The device according to claim 1, wherein the fluid is from a source of waste water.

11. A device for fluid treatment, comprising a circulation pump, a closed housing (1) having a tubular shape, and at least one stack of disk-shaped filters for removing biological material from the fluid, through which fluid flows, arranged in the housing, wherein the housing (1), with the stack located therein, and the circulation pump form a unit, the circulation pump being arranged in or on a cover (4) which closes the housing at one end, the cover (4) comprising an outer cover part (5) closing the housing (1) to the outside and an inner cover part (6) closing the cover (4) to the inside, the outer and inner cover parts being connected to one another, the inner cover part (6) comprising a cover inner part (6a) which forms a suction port (16) of the circulation pump and an intermediate part (6b) between the cover inner part (6a) and the outer cover part (5), the intermediate part (6b) surrounding an impeller (15) of the circulation pump and a pressure-side flow channel (18) of the circulation pump lies in the intermediate part (6b), wherein the intermediate part (6b) comprises an ejector (19) by which gas is admixed to the pressure-side flow channel (18) of the circulation pump.

12. The device according to claim 11, wherein the ejector (19) comprises a first gas channel (23) running through the cover inner part (6a) and leading into the housing (1).

13. The device according to claim 12, wherein the ejector (19) further comprises a second gas channel (23') running through the outer cover part (5) and leading to outside the housing (1).

14. The device according to claim 12, wherein the housing (1) has a middle longitudinal axis arranged approximately horizontally, and wherein the channel (23) leading to the ejector (19) and running through the cover inner part (6a) runs out at a top of the housing (1).

15. The device according to claim 12, wherein the cover inner part (6a) comprises a connecting channel (21), which connects an inside of the housing to a pressure side of the circulation pump, and wherein the connecting channel (21) runs out within the housing (1) below the first gas channel (23) leading to the ejector (19) and spaced from the suction port (16) of the circulation pump.

16. The device according to claim 11, wherein in the flow direction of the pump the pressure channel (18) has an outlet channel (35) and behind it an inlet channel (34) which run out in front of the ejector (19).

17. A device for fluid treatment, comprising;
a closed housing;
a cover at one end of the housing, the cover having an outer cover part (5) closing the housing (1) to the outside and an inner cover part (6) closing the cover (4) to the inside;
a circulation pump arranged in or on the cover; and
at least one stack of disk-shaped filters arranged in the housing for removing biological material from the fluid, wherein the inner cover part (6) has a cover inner part (6a) forming a suction port (16) of the circulation pump and an intermediate part (6b) between the cover inner part (6a) and the outer cover part (5), the intermediate part (6b) surrounding an impeller (15) of the circulation pump, a pressure-side flow channel (18) of the circulation pump being located in the intermediate part (6b), the intermediate part (6b) having an ejector (19) by which gas is admixed to the pressure-side flow channel (18) of the circulation pump.

* * * * *